(No Model.)
G. S. FRAZEY.
DEVICE FOR MILKING COWS.
No. 312,834. Patented Feb. 24, 1885.
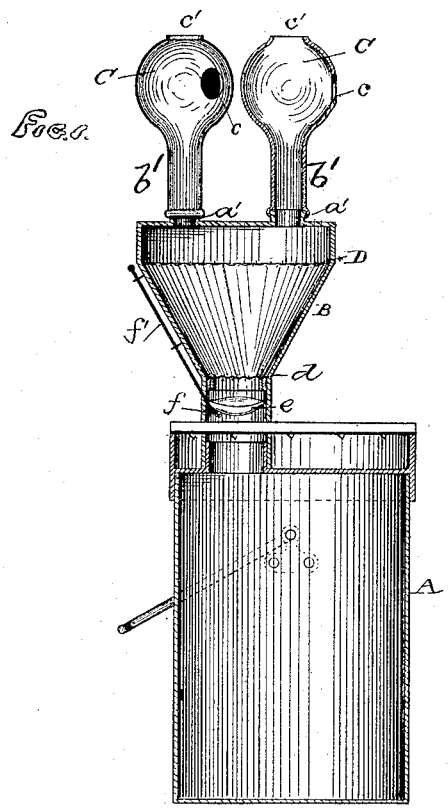
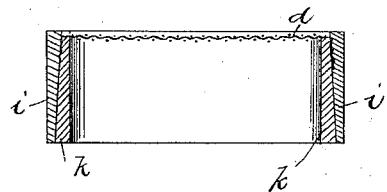
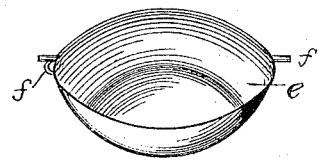

United States Patent Office.

GUY S. FRAZEY, OF JERSEY CITY, NEW JERSEY.

DEVICE FOR MILKING COWS.

SPECIFICATION forming part of Letters Patent No. 312,834, dated February 24, 1885.

Application filed June 16, 1882. (No model.)

*To all whom it may concern:*

Be it known that I, GUY S. FRAZEY, a citizen of the United States of America, residing at Jersey City, in the county of Hudson and State of New Jersey, have invented certain new and useful Improvements in Devices for Milking Cows, of which the following is a specification, reference being had therein to the accompanying drawings.

This invention consists in certain improvements in devices to be used in milking cows, and in a strainer and receiver to be used in connection therewith, as will be hereinafter described, and pointed out in the claims.

In the drawings, Figure 1 represents an elevation, partly in section, of the milking apparatus and the strainer as applied to a can ready for use. Fig. 2 represents one of the strainers separately. Fig. 3 represents my improved valve separately.

A represents a pail or can constructed according to my improvements, which is made the subject of another application filed February 14, 1884, Serial No. 120,732. The strainer B is shown as of funnel shape; but it may be of any other desired or convenient contour. This vessel B is provided in its upper portion with a strainer or sieve, D, of gauze or other suitable material, through which the milk first passes, and in its bottom with another strainer, d, which may, if desired, be of finer mesh than the strainer D, in order to secure a more perfect straining of the milk. Below this lower strainer, d, is situated a cup-shaped valve, e, which is eccentrically pivoted within the neck of the strainer D upon suitable journals. Said valve, while the strainer and can remain in upright position, tilts downward at an angle from the horizontal, as shown in Fig. 1, and thus permits the milk flowing therein to overflow down into the can; but should the can at any time be tipped or upset, the milk therein, in its endeavor to escape from the can, will press against the depending portion of said valve and force it to a horizontal position, and thus close the exit, thereby preventing the escape of the milk from the can.

*f* represents an eye, to which the lower end of a rod, *f'*, is attached. This rod extends outward and upward, as shown, to permit of the valve *e* being readily turned thereby in either direction, as desired. This rod, however, may be dispensed with, if desired, as it is not essential to the working of the cup-valve, which is automatic in action. The valve *e* is provided with a cup-rim, in order that any dirt accidentally passing through the strainers may settle therein. The strainers and other parts of this device are all readily removable, in order that they may be easily cleaned or repaired.

To the upper end of a tube, *a'*, in the top of the vessel B is attached the lower end or neck, *b'*, of a bulb-shaped teat-receiver, C, of rubber, leather, or other suitable elastic material. There may be either one or more of these tubes *a'* and teat-receivers C attached to the straining-vessel B, as desired or found most convenient.

In the drawings I have shown the straining-vessel B as supplied with two of each of such; but I do not limit myself to the employment of any specific number of either. This teat-receiver C has at its top a circular orifice, *c'*, within which the teat of the cow is inserted. In one side of the bulb is a circular or other shaped opening, *c*, through which, when the teat of the cow is inserted, the hand of the milker is passed for the purpose of grasping the teat and drawing the milk. These bulbs are formed with the orifice or opening *c* so small that on the hand of the milker being passed through the same and within the bulb the edges of said opening will tightly embrace the wrist of the milker, however small the wrist may be, and thereby entirely exclude communication through said opening with the outer atmosphere while said bulbs are in use.

By the use of these bulb-shaped teat-receivers the milk in its passage from the cow to the can A is not subjected to any poisonous or deleterious odors that may be adjacent. Thus the milk is not liable to become contaminated in its passage from the cow to the pail or can, as would be the case were it allowed to pass through the surrounding atmosphere. Moreover, any dust or dirt flying around cannot by any possibility reach the milk, as it is by this apparatus entirely isolated from contact therewith. These bulbs furnish, moreover, a protecting-covering to the hands of the milker, which is very advantageous in cold weather, and as the material of which these teat-receiving bulbs are constructed is soft and pliant, the edges of the orifices $c'$ will close against the teats in a similar manner to that in which the mouth of a calf would, and as the milker's hand will be warm, and the warmth therefrom be confined within the bulbs, the compression around and warmth imparted to the teat while milking with this device will conform very nearly to the impression produced thereon by a calf when sucking. Therefore the cow will be induced to give milk more freely by the use of this device than would be the case were these characteristics absent.

The strainer $d$ is, as shown in Fig. 2 of the drawings, held in place by two wedge-shaped tubes, $i\ k$. The wire-gauze or other straining material is first placed over the top of the inner tube, and then the outer tube is slid telescopically over the inner one, thereby securely holding the strainer in position and stretching it tightly.

Having thus described my invention, what I claim is—

1. The spherical tubes or bulbs C, having openings $c$ and $c'$ and necks $b'$, substantially as and for the purpose set forth.

2. The combination, with the tubes or bulbs C, having openings $c$ and $c'$ and necks $b'$, of a milk-receiver adapted to receive the lower ends or necks of said tubes or bulbs and support said bulbs in operative position during the operation of milking.

3. The combination, with the tubes or bulbs C, of the strainer B, having tubes $a'$, strainers D $d$, and eccentrically-mounted cup-valve $e$, substantially as and for the purpose set forth.

In testimony whereof I affix my signature in presence of two witnesses.

GUY S. FRAZEY.

Witnesses:
NICOL MICHELES,
EMIL HAMILTON.